US011303459B2

(12) United States Patent
Guo et al.

(10) Patent No.: US 11,303,459 B2
(45) Date of Patent: Apr. 12, 2022

(54) SMART TELEVISION TERMINAL AND METHOD FOR ESTABLISHING A TRUST CHAIN THEREFOR

(71) Applicants: Academy of Broadcasting Science, National Radio and Television Administration, Beijing (CN); HISILICON TECHNOLOGIES CO., LTD., Guangdong (CN)

(72) Inventors: Xiaoxia Guo, Beijing (CN); Lei Wang, Beijing (CN); Di Wu, Beijing (CN); Zhonghua Fang, Beijing (CN); Peiyu Guo, Beijing (CN)

(73) Assignees: Academy of Broadcasting Science, National Radio and Television Administration, Beijing (CN); HISILICON TECHNOLOGIES CO., LTD., Guangdong (CN)

( * ) Notice: Subject to any disclaimer, the term of this patent is extended or adjusted under 35 U.S.C. 154(b) by 161 days.

(21) Appl. No.: 16/613,062

(22) PCT Filed: Dec. 26, 2018

(86) PCT No.: PCT/CN2018/123857
§ 371 (c)(1),
(2) Date: Nov. 12, 2019

(87) PCT Pub. No.: WO2019/129046
PCT Pub. Date: Jul. 4, 2019

(65) Prior Publication Data
US 2020/0322172 A1 Oct. 8, 2020

(30) Foreign Application Priority Data
Dec. 27, 2017 (CN) .......................... 201711446498.4

(51) Int. Cl.
H04L 9/32 (2006.01)
H04L 9/30 (2006.01)
(Continued)

(52) U.S. Cl.
CPC ............ H04L 9/3265 (2013.01); H04L 9/083 (2013.01); H04L 9/3073 (2013.01);
(Continued)

(58) Field of Classification Search
CPC ... H04L 2209/38; H04L 9/083; H04L 9/3073; H04L 9/3247; H04L 9/3265;
(Continued)

(56) References Cited

U.S. PATENT DOCUMENTS 10,447,683 B1 * 10/2019 Loladia ................. H04W 12/63
2002/0023217 A1 2/2002 Wheeler et al.
(Continued)

FOREIGN PATENT DOCUMENTS

CN 103533403 A 1/2014
CN 104639327 A 5/2015
(Continued)

Primary Examiner — Michael Simitoski
(74) Attorney, Agent, or Firm — Saliwanchik, Lloyd & Eisenschenk

(57) ABSTRACT

Method for establishing a trust chain, comprising: requesting a third CA for a third key pair and a third certificate, writing a private key of the third key pair and the third certificate into a security storage area, the third certificate comprising model information of the smart television (SMTV) terminal and information of a public key of the third key pair. The SMTV terminal check its possession of a fourth certificate on every start, generate a unique fourth key pair in absence of a fourth certificate, submit online a public key of the fourth key pair and a unique identification of each SMTV terminal to a fourth CA to request for a fourth certificate, and send along the third certificate and a signa- (Continued)

ture signed on the request with the private key of the third key pair; write the fourth certificate into the security storage area upon receiving the fourth certificate.

8 Claims, 3 Drawing Sheets

(51) Int. Cl.
    *G06F 21/33*     (2013.01)
    *H04L 9/08*     (2006.01)
    *H04N 21/4623*     (2011.01)
    *H04N 21/4627*     (2011.01)
    *G06F 21/60*     (2013.01)

(52) U.S. Cl.
    CPC ..... *H04N 21/4623* (2013.01); *H04N 21/4627* (2013.01); *H04L 2209/38* (2013.01)

(58) Field of Classification Search
    CPC .......... H04L 63/0876; H04N 21/25875; H04N 21/4623; H04N 21/4627; H04N 21/63345; H04N 21/835
    See application file for complete search history.

(56) References Cited

U.S. PATENT DOCUMENTS

| | | | |
|---|---|---|---|
| 2003/0105876 A1* | 6/2003 | Angelo | H04L 63/126 709/237 |
| 2003/0177351 A1* | 9/2003 | Skingle | H04L 63/0823 713/156 |
| 2005/0066171 A1 | 3/2005 | Simon | |
| 2006/0168443 A1* | 7/2006 | Miller | H04L 51/00 713/156 |
| 2006/0234797 A1* | 10/2006 | Davis | G06F 21/71 463/43 |
| 2007/0186110 A1* | 8/2007 | Takashima | H04N 21/835 713/173 |
| 2008/0209207 A1* | 8/2008 | Parupudi | H04L 63/0823 713/156 |
| 2008/0313264 A1* | 12/2008 | Pestoni | H04L 9/3263 709/202 |
| 2009/0037728 A1* | 2/2009 | Kamikura | H04L 9/3263 713/156 |
| 2010/0132025 A1* | 5/2010 | Imai | H04L 63/0876 726/10 |
| 2011/0161659 A1* | 6/2011 | Himawan | H04L 9/006 713/156 |
| 2013/0129087 A1* | 5/2013 | Qi | G06F 21/602 380/44 |
| 2014/0026161 A1* | 1/2014 | Zheng | H04N 21/4627 725/29 |
| 2015/0113627 A1* | 4/2015 | Curtis | H04W 12/069 726/10 |
| 2015/0244709 A1* | 8/2015 | Goldman | H04L 9/3263 713/156 |
| 2016/0239686 A1* | 8/2016 | Kwon | G06F 21/606 |
| 2016/0323104 A1* | 11/2016 | Mayers | H04L 63/0407 |
| 2017/0041150 A1* | 2/2017 | Ishiguro | H04L 9/3268 |
| 2017/0331828 A1* | 11/2017 | Caldera | H04L 63/104 |
| 2018/0062861 A1* | 3/2018 | Brockhaus | G06F 21/33 |
| 2018/0211025 A1* | 7/2018 | Brockhaus | H04L 63/0823 |
| 2018/0234255 A1* | 8/2018 | Fu | H04L 9/08 |
| 2018/0323977 A1* | 11/2018 | Hojsik | H04L 63/061 |
| 2019/0149342 A1* | 5/2019 | Fynaardt | H04L 63/00 713/156 |
| 2020/0366506 A1* | 11/2020 | Brockhaus | H04L 63/0823 |

FOREIGN PATENT DOCUMENTS

| | | | | |
|---|---|---|---|---|
| CN | 107070657 A | | 8/2017 | |
| CN | 107171805 A | | 9/2017 | |
| WO | WO-02065696 A1 | * | 8/2002 | ........... H04L 9/3263 |

* cited by examiner

Requesting a third CA for a third key pair and a third certificate, writing a private key of the third key pair and the third certificate into a security storage area of the smart television terminal, the third certificate comprising a model information of the smart television terminal and information of a public key of the third key pair ⟶ 11

Configuring the smart television terminal to: check its possession of a fourth certificate on every start, generate a unique fourth key pair in absence of a fourth certificate, submit online a public key of the fourth key pair and a unique identification of each smart television terminal to a fourth CA to request for a fourth certificate, and send along the third certificate and a signature signed on the request with the private key of the third key pair ⟶ 12

Configuring the smart television terminal to: write the fourth certificate into the security storage area of the smart television terminal upon receiving the fourth certificate ⟶ 13

FIG. 1

A first key pair generation authority generates a same, unique first key pair for chips of the same chip model, a public key of the first key pair being used for being written into a one-time-programmable area of the chip, the first key pair generation authority being a security authentication authority or a authority authorized by a security authentication authority — 21

An operator generates a same, unique second key pair for smart television terminals of the same smart television terminal model, and sending a public key of the second key pair to said first key pair generation authority in such a way that said first key pair generation authority signs on the public key of the second key pair with a private key of the first key pair, in order to obtain a first signature; said operator signs on a system mirror image of the smart television terminal with a private key of the second key pair, in order to obtain a second signature — 22

A terminal provider acquires the second signature, the public key of the second key pair, and the first signature, and burns the system image, the second signature, the public key of the second key pair, and the first signature into the storage area of the smart television terminal — 23

FIG. 2

Configuring the smart television terminal in such a way that: a third-party client application in the smart television terminal sends a request for a third-party certificate chain to a third-party CA, and sends a fourth certificate along, the request being signed with a private key of the fourth key pair, the request for the third-party certificate chain being used for obtaining a certificate chain from a third-party root CA certificate to a third-party client certificate and a private key of a fifth key pair, wherein information of a public key of the fifth key pair is contained in the third-party client certificate — 31

Configuring the smart television terminal in such a way that: the third-party client application receives the third-party certificate chain and the private key of the fifth key pair sent from the third-party CA, and stores the third-party certificate chain and the private key of the fifth key pair into the security storage area of the smart television terminal — 32

FIG. 3

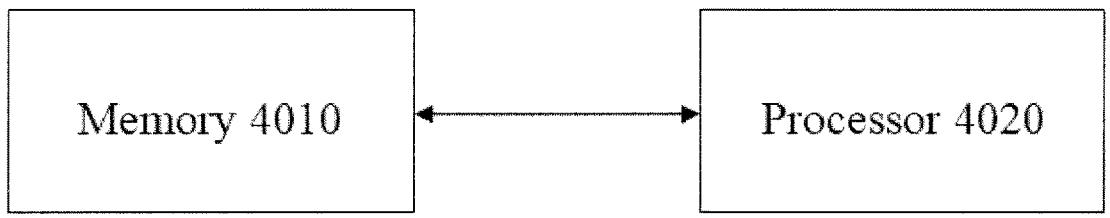

FIG. 4

SMART TELEVISION TERMINAL AND METHOD FOR ESTABLISHING A TRUST CHAIN THEREFOR

CROSS REFERENCE TO RELATED APPLICATIONS

This application is a National Stage of International Application No. PCT/CN2018/123857, filed on Dec. 26, 2018, which claims priority to Chinese Patent Application No. 201711446498.4, filed on Dec. 27, 2017, both of which are hereby incorporated by reference in their entireties.

FIELD OF THE INVENTION

The present disclosure relates to the technical field of smart television, and in particular, to a smart television terminal and a method for establishing a trust chain therefor.

BACKGROUND OF THE INVENTION

A smart television terminal refers to a terminal product with a smart television operating system installed, for example, a smart set-top box, an all-in-one smart television, etc. Typically, there are stored in a smart television terminal a private key of an asymmetric key pair, and a certificate (usually referred to as a device certificate, i.e. a fourth certificate that will be described in the present disclosure) issued to a public key of said asymmetric key pair by a certain CA (Certificate Authority). The device certificate and the private key constitute a base of trust for upper-tier businesses of the smart television terminal, because they require uniquity and confidentiality in order to realize communication with a server and to realize functions based on the device certificate, such as encryption and decryption, signature and authentication, etc. The device certificate and the private key have a certain degree of security risk, no matter whether they are pre-stored in the smart television terminal or issued online to the smart television terminal. For example, there is a risk that the private key might be leaked out during a course from generating the private key by a certain authority to writing the private key into the smart television terminal, or the device certificate and the private key might be issued to an illegal smart television terminal without sufficient security authentication.

SUMMARY OF THE INVENTION

One aim of the present disclosure is to provide a novel technical solution of a method for establishing a trust chain for a smart television terminal, in order to solve at least one of the above-mentioned technical problems.

According to a first aspect of the present disclosure, there is provided a method for establishing a trust chain for a smart television terminal, the smart television terminal having a unique identification, and the method comprises: requesting a third CA for a third key pair and a third certificate, writing a private key of the third key pair and the third certificate into a security storage area of the smart television terminal, the third certificate comprising information of a model of the smart television terminal and information of a public key of the third key pair; configuring the smart television terminal to: check its possession of a fourth certificate on every start, generate a unique fourth key pair in absence of a fourth certificate, submit online a public key of the fourth key pair and a unique identification of each smart television terminal to a fourth CA to request for a fourth certificate, and send along the third certificate and a signature signed on the request with the private key of the third key pair; configuring the smart television terminal to: write the fourth certificate into the security storage area of the smart television terminal upon receiving the fourth certificate.

Optionally, information of the model of the smart television terminal comprises a model of the smart television terminal, a chip model of the chip used by the smart television terminal, and terminal provider information.

Optionally, writing a private key of the third key pair and the third certificate into a security storage area of the smart television terminal comprises: a trusted program operating in a secure operating system writing the private key of the third key pair and the third certificate into the security storage area of the smart television terminal.

Optionally, prior to requesting the third CA for a third key pair and a third certificate, the method further comprises: a first key pair generation authority generating the same first key pair for chips of the same chip model, a public key of the first key pair being used for being written into a one-time-programmable area of the chip, the first key pair generation authority being a security authentication authority or a authority authorized by a security authentication authority, and the first key pair generation authority submitting the public key of the first key pair to a first CA to request for a first certificate; an operator generating the same second key pair for a smart television terminal of the same smart television terminal model, and sending a public key of the second key pair to said first key pair generation authority in such a way that said first key pair generation authority signs on the public key of the second key pair with the private key of the first key pair to obtain a first signature; said operator signing on a system mirror image of the smart television terminal with a private key of the second key pair to obtain a second signature, and the operator submitting the public key of the second key pair to a second CA to request for a second certificate; a terminal provider obtaining the second signature, the public key of the second key pair and the first signature, and burning the system mirror image, the second signature, the public key of the second key pair, and the first signature into a storage area of the smart television terminal.

Optionally, after configuring the smart television terminal to write the fourth certificate into the security storage area of the smart television terminal upon receiving the fourth certificate, the method further comprises: configuring the smart television terminal in such a way that: a third-party client application in the smart television terminal sends a request for a third-party certificate chain to a third-party CA and sends a fourth certificate along, the request being signed with a private key of the fourth key pair, the request for the third-party certificate chain being used for obtaining a certificate chain from a third-party root CA certificate to a third-party client certificate and a private key of a fifth key pair, wherein information of a public key of the fifth key pair is contained in the third-party client certificate; configuring the smart television terminal in such a way that: the third-party client application receives the third-party certificate chain and the private key of the fifth key pair sent from the third-party CA, and stores the third-party certificate chain and the private key of the fifth key pair into the security storage area of the smart television terminal.

According to a second aspect of the present disclosure, there is provided a smart television terminal, which has a unique identification and is configured to: prestore a third certificate and a private key of a third key pair generated by a third CA, the third certificate comprising information of a public key of the third key pair and information of a model of the smart television terminal, wherein smart television terminals of the same model have the same third certificate and the same private key of the third key pair; check its possession of a fourth certificate on every start, generate a unique fourth key pair in absence of a fourth certificate, submit online a public key of the fourth key pair and a unique identification of each smart television terminal to a fourth CA to request for a fourth certificate, and send along the third certificate and a signature signed on the request with the private key of the third key pair, and write the received fourth certificate into a security storage area of the smart television terminal.

Optionally, the chip in every smart television terminal has a unique identification; the smart television terminal is further configured to: generate a unique identification for each smart television terminal according to the unique identification of the chip in the smart television terminal and the smart television terminal model information of the smart television terminal.

Optionally, information of the model of the smart television terminal comprises a model of the smart television terminal, a chip model of the chip used by the smart television terminal, and terminal provider information.

Optionally, writing a private key of the third key pair and the third certificate into the security storage area of the smart television terminal comprises: a trusted program operating in the secure operating system writing the private key of the third key pair and the third certificate into the security storage area of the smart television terminal.

Optionally, prestoring a system mirror image, a second signature, a public key of the second key pair, and a first signature, wherein the first signature is a signature on the public key of the second key pair signed with a private key of a first key pair, and the second signature is a signature on a system mirror image signed with a private key of the second key pair, chips of the same chip model having the same first key pair, and smart television terminals of the same smart television terminal model having the same second key pair, and the public key of the second key pair having a second certificate available for queries, the second certificate being obtained by an operator of the smart television terminal by submitting the public key of the second key pair to a second CA to request for the second certificate.

Optionally, the smart television terminal is further configured in such a way that: a third-party client application in the smart television terminal sends a request for a third-party certificate chain to a third-party CA and sends a fourth certificate along, the request being signed with a private key of the fourth key pair, the request for the third-party certificate chain being used for obtaining a certificate chain from a third-party root CA certificate to a third-party client certificate and a private key of a fifth key pair, wherein information of a public key of the fifth key pair is contained in the third-party client certificate; the third-party client application receives the third-party certificate chain and the private key of the fifth key pair sent from the third-party CA, and stores the third-party certificate chain and the private key of the fifth key pair into the security storage area of the smart television terminal.

According to a third aspect of the present disclosure, there is provided a smart television terminal, which has a unique identification, the smart television terminal comprising a memory and a processor, the memory being used for storing instructions, and also for prestoring a third certificate and a private key of a third key pair generated by a third CA, the third certificate comprising information of a public key of the third key pair and information of a model of the smart television terminal, wherein smart television terminals of the same model have the same third certificate and the same private key of the third key pair;

Said instructions are used for controlling the processor to operate to execute the following steps:

the smart television terminal checking its possession of a fourth certificate on every start, generating a unique fourth key pair in absence of a fourth certificate, submitting online a public key of the fourth key pair and a unique identification of each smart television terminal to a fourth CA to request for a fourth certificate, and sending along the third certificate and a signature signed on the request with the private key of the third key pair; and writing the received fourth certificate into a security storage area of the smart television terminal.

One beneficial effect of the present disclosure lies in that according to the embodiments of the present disclosure, a safe online issuance of the fourth certificate is achieved, and security of the private key of the fourth key pair is guaranteed, thereby the security of the smart television terminal is further guaranteed.

Further characteristics of the present disclosure and advantages thereof will become apparent from the following detailed description of exemplary embodiments according to the present disclosure with reference to the following drawings.

BRIEF DESCRIPTION OF THE DRAWINGS

The accompanying drawings, which are incorporated in and constitute a part of the specification, illustrate embodiments of the present disclosure and, together with the description thereof, serve to explain the principles of the present disclosure.

FIG. 1 is a flow chart of a method for establishing a trust chain for a smart television terminal according to Embodiment 1 of the present disclosure.

FIG. 2 is a flow chart of a method for establishing a trust chain for a smart television terminal according to Embodiment 2 of the present disclosure.

FIG. 3 is a flow chart of a method for establishing a trust chain for a smart television terminal according to Embodiment 3 of the present disclosure.

FIG. 4 is a schematic diagram of a hardware structure of a smart television terminal according to one embodiment of the present disclosure.

DETAILED DESCRIPTION OF THE EMBODIMENTS

Various exemplary embodiments of the present disclosure are now described in detail with reference to the drawings. It should be noted that the relative arrangements of components and steps, the numerical expressions and the numerical values elaborated in the embodiments do not limit the scope of the invention unless it is specifically stated otherwise.

Actually, the following description of at least one exemplary embodiment is for illustrative purposes only, and shall not be interpreted as limiting the present disclosure and application or use thereof.

Techniques, methods, and smart television terminals known to those skilled in the art may not be discussed in detail here; however, where appropriate, said techniques, methods, and smart television terminals should be regarded as a part of the specification.

In all of the examples shown and discussed herein, any specific value should only be interpreted as illustrative rather than limiting. Thus, other examples of the exemplary embodiments could take different values.

Please note that similar reference numerals and letters represent similar items in the following drawings; thus, once a certain item is defined with respect to one figure, it needs no discussion with respect to figures thereafter.

Speaking of smart television terminals according to the present disclosure, each of them has a unique identification. Such a unique identification may, for example, be generated and then written into the smart television terminal by a producer or an operator thereof. It may also be generated by the smart television terminal itself according to a preset algorithm. For example, a security chip used in each smart television terminal has its own unique identification, and the smart television terminal generates a unique identification for each smart television terminal according to the unique identification of said security chip in conjunction with its own smart television terminal model information.

Method Embodiment

Regarding Embodiment 1 as shown in FIG. 1, the method comprises the following steps.

In Step 11, requesting a third CA for a third key pair and a third certificate, and writing a private key of the third key pair and a third certificate into a security storage area of the smart television terminal, the third certificate comprising information of a model of the smart television terminal and information of a public key of the third key pair.

Step 11, can be accomplished by terminal providers, for example. The information authenticated with the third certificate, for example, includes information of a chip model information of the chip used in the smart television terminal, and information of a model of the smart television terminal, as well as a terminal provider of the smart television terminal, a chip identification (every chip has a unique chip identification), a model ID (smart television terminals of the same model have the same model ID), etc.

The private key of the third key pair and the third certificate may be written into a security storage area of the smart television terminal by invoking a trusted application in a secure operating system of the smart television terminal, for example.

Said terminal providers include suppliers of terminal software and producers of terminal devices.

In Step 12, configuring the smart television terminal to: check its possession of a fourth certificate on every start, generate a unique fourth key pair in absence of a fourth certificate, submit online a public key of the fourth key pair and a unique identification of each smart television terminal to a fourth CA to request for a fourth certificate, and send along a third certificate and a signature signed on the request with the private key of the third key pair.

Step 12 can be accomplished by a terminal provider or an operator, wherein the fourth CA is managed by an operator, and is arranged specifically at the operator or at a neutral authentication and assessment authority.

The fourth CA verifies the validity of the third certificate, and determines whether to issue a fourth certificate. In some examples, the fourth CA may also be aware of the identification of the smart television terminal in advance, and then it is possible to verify the validity of the smart television terminal identification submitted by the smart television terminal which requests the fourth CA for a fourth certificate.

In Step 13, configuring the smart television terminal to: write the fourth certificate into the security storage area of the smart television terminal upon receiving the fourth certificate.

Step 13, for example, can be accomplished by a terminal provider or an operator. The fourth certificate is used for guaranteeing security of subsequent communications of the smart television terminal with other authorities.

The fact that the private key of the fourth key pair is generated by the smart television terminal itself and stays permanently in the smart television terminal, is advantageous for guaranteeing the security of the private key of the fourth key pair.

The fact that the fourth certificate is issued online by the fourth CA, which verifies the third certificate and the identification of the smart television terminal before issuing, further guarantees the security of the fourth certificate.

In addition, as the operator knows the total numbers of smart television terminals of the same model (or it also knows the identification of each smart television terminal), therefore, even if there is a leakage of all the above-mentioned information, the fourth CA is still able to control a total number of the fourth certificates according to said total numbers, and this further guarantees that the smart television terminals will not be illegally accessed or illegally duplicated.

As shown in FIG. 2, before the method given by Embodiment 1, the method provided by Embodiment 2 is implemented and it comprises the following steps.

In Step 21, a first key pair generation authority generates the same first key pair for chips of the same chip model, a public key of the first key pair being used for being written into a one-time-programmable area of the chip, the first key pair generation authority being a security authentication authority or a authority authorized by a security authentication authority.

The security responsibility of the first key pair generation authority lies in taking charge of the security of lower-layer chips, and constructing a trust root for a secure trust chain. In one example, the first key pair generation authority is, for example, a chip provider. The first key pair, for example, is generated by a first signature system deployed by the chip provider.

Furthermore, the chip provider submits a public key of the first key pair to a first CA in order to request for a first certificate. The security of the public key of the first key pair publicly provided by the chip provider is thereby guaranteed by the credibility of the first CA, further realizing procedures such as revocation of the first key pair and the first certificate, as well as management of validity period thereof.

In Step 22, the operator generates the same second key pair for smart television terminals of the same smart television terminal model, and sends a public key of the second key pair to said first key pair generation authority in such a way that said first key pair generation authority signs on a public key of a second key pair with a private key of a first key pair to obtain a first signature; said operator signs on a system mirror image of the smart television terminal with a private key of the second key pair to obtain a second signature, A second signature system for generating a second key pair is provided, for example, at the operator.

Furthermore, the operator also submits the public key of the second key pair to a second CA to request for a second certificate. The security of the public key of the second key pair publicly provided by the operator is thereby guaranteed by the credibility of the second CA, further realizing procedures such as revocation of the first key pair and the first certificate, and management of a validity period thereof.

Information requested by the second signature system for a first signature from the first signature system includes, for example, a session ID, an operator ID, a terminal ID, a first key pair generation authority ID, a chip model, a smart television terminal signal, a second certificate, a message signature, a certificate chain of the operator, etc.

A message sent back from the first signature system to the second signature system include, for example, a session ID, a result information, a signature by the private key of the first key pair on the public key of the second key pair, a first certificate, a message signature, a certificate chain of the first key pair generation authority, etc.

The security responsibility of the operator lies in verifying for the security of a smart television terminal image.

The first key pair generation authority signs on the public key of the second key pair with the private key of the first key pair, thereby guaranteeing the security of the public key of the second key pair by the first key pair generation authority and the operator together.

The system mirror image of the smart television terminal is generated by a terminal provider, which sends the system mirror image to an operator, and the operator signs on the system mirror image (the image of boot programs in each level of the smart television terminal) with the private key of the second key pair, thereby guaranteeing security of the system mirror image finally written into the smart television terminal by the terminal provider.

In Step 23, the terminal provider acquires the second signature, the public key of the second key pair, and the first signature, and burns the system mirror image, the second signature, the public key of the second key pair, and said first signature into a storage area of the smart television terminal.

The security responsibility of the terminal provider lies in burning a system mirror image based on a secure trust chain verification authority.

A model-specified management for the security assurance of chips and smart television terminals can be achieved by generating the same first key pair for chips of the same model and generating the same second key pair for smart television terminals of the same model.

A verification process for a safe boot of the smart television terminal is as follows.

First, a fixed code in the ROM of the smart television terminal reads out the public key of the first key pair from a one-time-programmable area of the chip, and reads out the public key of the second key pair from the storage area of the smart television terminal to combine with the first signature in the storage area, in order to accomplish the verification of the public key of the second key pair by the public key of the first key pair.

Then, the fixed code in the ROM of the smart television terminal verifies the boot program with the public key of the second key pair or the public key of the first key pair.

Next, the boot program verifies a mirror image of a secure operating system (Secure OS) with the public key of the second key pair.

Finally, the boot program verifies a mirror image of a core (Kernel) of the operating system with the public key of the second key pair.

It should be noted that a verification failure in any of the above environments will lead to a boot failure of the smart television terminal.

In such a way, the first key pair generation authority and the operator together participate in establishment of a trust chain for the system mirror image in the smart television terminal finally produced by the terminal provider. The first key pair and the second key pair are managed and distributed in the form of certificate, thereby realizing standardization, traceability, trustworthiness, manageability and scalability of the first key pair and the second key pair, in an entire process including generation, distribution and usage. The authenticity, completeness, and validity of boot codes, etc., are thus guaranteed.

As shown in FIG. 3, after the method provided by Embodiment 1, further comprise the following steps:

In Step 31, configuring the smart television terminal in such a way that: a third-party client application in the smart television terminal sends a request for a third-party certificate chain to a third-party CA, and sends a fourth certificate along, the request being signed with the private key of the fourth key pair, the request for the third-party certificate chain being used for obtaining a certificate chain from a third-party root CA certificate to a third-party client certificate and a private key of a fifth key pair, wherein information of a public key of the fifth key pair is contained in the third-party client certificate.

In Step 32, configuring the smart television terminal in such a way that: the third-party client application receives the third-party certificate chain and the private key of the fifth key pair sent from the third party CA, and stores the third-party certificate chain and the private key of the fifth key pair into the security storage area of the smart television terminal.

The subject for implementing Step 31 and Step 32 is, for example, an operator or a producer. Based on the above described trust authority, an automatic online introduction of a trust chain for the third-party client can be further realized. The security risk of a beforehand implantation of the third-party client trust chain into the smart television terminal is thus avoided.

Device Embodiment

Based on the methods according to Embodiments 1 to 3, the present disclosure also provides a smart television terminal for implementing the above methods.

A smart television terminal with a unique identification, which is configured to:
 prestore a third certificate and a private key of a third key pair generated by a third CA, the third certificate comprising information of a public key of the third key pair and information of a model of the smart television terminal, wherein smart television terminals of the same model have the same third certificate and the same private key of the third key pair;
 check its possession of a fourth certificate on every start, generate a unique fourth key pair in absence of a fourth certificate, submit online a public key of the fourth key pair and a unique identification of each smart television terminal to a fourth CA to request for a fourth certificate, and send along the third certificate and a signature signed on the request with the private key of the third key pair, wherein the fourth CA acquires the total numbers of smart television terminals of each model, and determines a total number of fourth certificates that can be issued by the fourth CA based on said total numbers;
 write the received fourth certificate into a security storage area of the smart television terminal.

In such a way, an online issuance of a fourth certificate is realized, guaranteeing security of the smart television terminal. The fact that the private key of the fourth key pair stays permanently in the smart television terminal ever since its generation, further guarantees the security of the private key of the fourth key pair.

Optionally, the chip in every smart television terminal has a unique identification; the smart television terminal is further configured to: generate a unique identification for each smart television terminal according to the unique identification of the chip in the smart television terminal and the smart television terminal model information of the smart television terminal.

Optionally, information of the model of the smart television terminal includes a model of the smart television terminal, a chip model of the chip used by the smart television terminal, and terminal provider information.

Optionally, a trusted program operated in the secure operating system writes the private key of the third key pair and the third certificate into the security storage area of the smart television terminal.

Furthermore, a system mirror image, a second signature, a public key of the second key pair, and a first signature are prestored in the smart television terminal, wherein the first signature is a signature on a public key of a second key pair signed with a private key of a first key pair, and the second signature is a signature on the system mirror image signed with a private key of the second key pair, chips of the same chip model having the same first key pair, smart television terminals of the same smart television terminal model having the same second key pair, and the public key of the second key pair having a second certificate available for queries, the second certificate being obtained by an operator of the smart television terminal by submitting the public key of the second key pair to a second CA to request for the second certificate.

Please refer to the method provided by Embodiment 2 for beneficial effects.

In one embodiment of the present disclosure, the smart television terminal can be further configured in such a way that: a third-party client application in the smart television terminal sends a request for a third-party certificate chain to a third-party CA, and sends a fourth certificate along, the request being signed with the private key of the fourth key pair, the request for the third-party certificate chain being used for obtaining a certificate chain from a third-party root CA certificate to a third-party client certificate and a private key of a fifth key pair, wherein information of a public key of the fifth key pair is contained in the third-party client certificate; and, the third-party client application receives the third-party certificate chain and the private key of the fifth key pair sent from the third-party CA, and stores the third-party certificate chain and the private key of the fifth key pair into a security storage area of the smart television terminal.

In the embodiments, by realizing the online issuance of the third certificate, the security of the third-party certificate is further guaranteed based on security of the fourth certificate.

Hardware Structure Embodiment

FIG. 4 is a schematic diagram of a hardware structure of a smart television terminal according to the embodiments of the present disclosure.

In this embodiment, the smart television terminal has a unique identification. As shown in FIG. 4, the smart television terminal comprises a memory 4010 and a processor 4020, the memory 4010 being used for storing instructions and also for prestoring a third certificate and a private key of a third key pair generated by a third CA, the third certificate comprising information of a public key of the third key pair and information of a model of the smart television terminal, wherein smart television terminals of the same model have the same third certificate and the same private key of the third key pair.

Said instructions are used for controlling the processor 4020 to operate to execute the following steps: the smart television terminal checking its possession of a fourth certificate on every start, generating a unique fourth key pair in absence of a fourth certificate, submitting online a public key of the fourth key pair and a unique identification of each smart television terminal to a fourth CA to request for a fourth certificate, and sending along the third certificate and a signature signed on the request with the private key of the third key pair; and writing the received fourth certificate into a security storage area of the memory 4010 of the smart television terminal.

Part of the storage area of the memory 4010 is divided to be a security storage area, which is accessible only for a secure operating system mounted on the processor 4020.

A skilled person can design instructions according to the solutions disclosed by the present disclosure. It belongs to common knowledge in the art regarding how the instructions control the processor to operate; thus, no more details will be given here.

The memory 4010, for example, comprises at least one of ROM (Read-Only Memory), RAM (Random-Access Memory), and a non-volatile memory such as a hard disk, etc.

The smart television terminal of the present disclosure may also comprise an interface device, a communication device, a display device, an input device, etc.

The interface device, for example, comprises a video interface, etc. The communication device, for example, is capable of wire or wireless communication. The input device, for example, may comprise a touch screen, a keyboard, etc. The display device, for example, may comprise a digital display screen, etc.

The above smart television terminal model information may comprise a model of the smart television terminal, a chip model of the chip used by the smart television terminal, and terminal provider information.

Furthermore, the writing of the private key of the third key pair and the third certificate into the security storage area of the smart television terminal may include: a trusted program operating in a secure operating system writing the private key of the third key pair and the third certificate into the security storage area of the smart television terminal.

Furthermore, the memory 4010 may also prestore a system mirror image, a second signature, a public key of the second key pair, and a first signature, wherein the first signature is a signature on a public key of a second key pair signed with a private key of a first key pair, and the second signature is a signature on the system mirror image signed with a private key of the second key pair, chips of the same chip model have the same first key pair, and smart television terminals of the same smart television terminal model have the same second key pair, and the public key of the second key pair has a second certificate available for queries, the second certificate being obtained by an operator of the smart television terminal by submitting the public key of the second key pair to a second CA to request for the second certificate.

Said instructions are used for controlling the processor 4020 to operate to execute the following steps: triggering a third-party client application in the smart television terminal to send a request for a third-party certificate chain to a third-party CA, and sending a fourth certificate along, the request being signed with a private key of the fourth key pair, the request for the third-party certificate chain being used for obtaining a certificate chain from a third-party root CA certificate to a third-party client certificate and a private key of a fifth key pair, wherein information of a public key of the fifth key pair is contained in the third-party client certificate; and, controlling the third-party client application to receive the third-party certificate chain and the private key of the fifth key pair sent from the third-party CA, and to store the third-party certificate chain and the private key of the fifth key pair into the security storage area of the smart television terminal.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is defined by the attached claims.

What is claimed is:

1. A method for establishing a trust chain for a smart television terminal, characterized that,
    the smart television terminal has a unique identification, the method comprises:
        requesting a third CA for a third key pair and a third certificate, writing a private key of the third key pair and the third certificate into a security storage area of the smart television terminal, the third certificate comprising information of a model of the smart television terminal and information of a public key of the third key pair;
        configuring the smart television terminal to: check its possession of a fourth certificate on every start, generate a unique fourth key pair in absence of a fourth certificate, submit online a public key of the fourth key pair and a unique identification of each smart television terminal to a fourth CA to request for a fourth certificate, and send along the third certificate and a signature signed on the request with the private key of the third key pair;
        configuring the smart television terminal to: write the fourth certificate into the security storage area of the smart television terminal upon receiving the fourth certificate,
    prior to requesting the third CA for a third key pair and a third certificate, the method further comprises:
        a first key pair generation authority generating the same first key pair for chips of the same chip model, a public key of the first key pair being used for being written into a one-time-programmable area of the chip, the first key pair generation authority being a security authentication authority or a authority authorized by a security authentication authority, and the first key pair generation authority submitting the public key of the first key pair to a first CA to request for a first certificate;
        an operator generating the same second key pair for smart television terminals of the same smart television terminal model, and sending a public key of the second key pair to said first key pair generation authority in such a way that said first key pair generation authority signs on the public key of the second key pair with a private key of the first key pair, in order to obtain a first signature; said operator signing on a system mirror image of the smart television terminal with a private key of the second key pair, in order to obtain a second signature, and the operator submitting the public key of the second key pair to a second CA to request for a second certificate; and
        a terminal provider acquiring the second signature, the public key of the second key pair and the first signature, and burning the system mirror image, the second signature, the public key of the second key pair, and the first signature into the storage area of the smart television terminal.

2. The method according to claim 1, characterized in that, information of the model of the smart television terminal comprises a model of the smart television terminal, a chip model of a chip used by the smart television terminal, and terminal provider information.

3. The method according to claim 1, characterized in that, writing a private key of the third key pair and the third certificate into a security storage area of the smart television terminal comprises:
    a trusted program operating in a secure operating system writing the private key of the third key pair and the third certificate into the security storage area of the smart television terminal.

4. The method according to claim 1, characterized in that, after configuring the smart television terminal to write the fourth certificate into the security storage area of the smart television terminal upon receiving the fourth certificate, the method further comprises:
    configuring the smart television terminal in such a way that: a third-party client application in the smart television terminal sends a request for a third-party certificate chain to a third-party CA, and sends the fourth certificate along, the request being signed with a private key of the fourth key pair, the request for the third-party certificate chain being used for obtaining a certificate chain from a third-party root CA certificate to a third-party client certificate and a private key of a fifth key pair, wherein information of a public key of the fifth key pair is contained in the third-party client certificate;
    configuring the smart television terminal in such a way that: the third-party client application receives the third-party certificate chain and the private key of the fifth key pair sent from the third-party CA, and stores the third-party certificate chain and the private key of the fifth key pair into the security storage area of the smart television terminal.

5. A smart television terminal, characterized in that, the smart television terminal has a unique identification and
    the smart television terminal comprises a memory and a processor, the memory being used for storing instructions, and also for prestoring a third certificate and a private key of a third key pair generated by a third CA, the third certificate comprising information of a public key of the third key pair and information of a model of the smart television terminal, wherein smart television terminals of the same model have the same third certificate and the same private key of the third key pair;
    said instructions being used for controlling the processor to operate to execute the following steps:
        the smart television terminal checking its possession of a fourth certificate on every start, generating a unique fourth key pair in absence of a fourth certificate, submitting online a public key of the fourth key pair and a unique identification of each smart television terminal to a fourth CA to request for a fourth certificate, and sending along the third certificate and a signature signed on the request with the private key of the third key pair;

writing the received fourth certificate into a security storage area of the smart television terminal, and prestoring a system mirror image, a second signature, a public key of a second key pair, and a first signature, wherein the first signature is a signature on a public key of a second key pair signed with a private key of a first key pair, and the second signature is a signature on a system mirror image signed with a private key of the second key pair, chips of the same chip model having the same first key pair, and smart television terminals of the same smart television terminal model having the same second key pair, and the public key of the second key pair has a second certificate available for queries, the second certificate being obtained by an operator of the smart television terminal by submitting the public key of the second key pair to a second CA to request for the second certificate.

6. The smart television terminal according to claim 5, characterized in that, information of a model of the smart television terminal comprises a model of the smart television terminal, a chip model of a chip used by the smart television terminal, and terminal provider information.

7. The smart television terminal according to claim 5, characterized in that, writing a private key of the third key pair and the third certificate into the security storage area of the smart television terminal comprises:

a trusted program operating in a secure operating system writing the private key of the third key pair and the third certificate into the security storage area of the smart television terminal.

8. The smart television terminal according to claim 5, characterized in that, it is further configured in such a way that:

a third-party client application in the smart television terminal sends a request for a third-party certificate chain to a third-party CA, and sends the fourth certificate along, the request being signed with a private key of the fourth key pair, the request for the third-party certificate chain being used for obtaining a certificate chain from a third-party root CA certificate to a third-party client certificate and a private key of a fifth key pair, wherein information of a public key of the fifth key pair is contained in the third-party client certificate;

the third-party client application receives the third-party certificate chain and the private key of the fifth key pair sent from the third-party CA, and stores the third-party certificate chain and the private key of the fifth key pair into the security storage area of the smart television terminal.

* * * * *